(12) United States Patent
Masters (10) Patent No.: US 7,875,223 B2
(45) Date of Patent: Jan. 25, 2011

(54) FABRICATION OF A SOFT-SILICONE COVER FOR A HEARING INSTRUMENT SHELL

(75) Inventor: Martin W. Masters, Shoreview, MN (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 0 days.

(21) Appl. No.: 12/018,857

(22) Filed: Jan. 24, 2008

(65) Prior Publication Data

US 2009/0189313 A1    Jul. 30, 2009

(51) Int. Cl.
*B29C 45/14* (2006.01)

(52) U.S. Cl. .................. 264/250; 264/275; 264/272.15

(58) Field of Classification Search .................. None
See application file for complete search history.

(56) References Cited

U.S. PATENT DOCUMENTS

| | | | | |
|---|---|---|---|---|
| 3,440,314 A | * | 4/1969 | Frisch | 264/222 |
| 4,617,429 A | * | 10/1986 | Bellafiore | 381/324 |
| 4,712,245 A | * | 12/1987 | Lyregaard | 381/324 |
| 4,735,759 A | * | 4/1988 | Bellafiore | 264/221 |
| 4,800,636 A | * | 1/1989 | Topholm | 29/896.21 |
| 4,828,777 A | * | 5/1989 | Birkholz | 264/139 |
| 4,870,688 A | * | 9/1989 | Voroba et al. | 381/60 |
| 5,146,051 A | * | 9/1992 | Hermann | 181/130 |
| 6,339,648 B1 | * | 1/2002 | McIntosh et al. | 381/328 |
| 6,393,130 B1 | * | 5/2002 | Stonikas et al. | 381/322 |
| 6,584,207 B1 | * | 6/2003 | Yoest et al. | 381/322 |
| 2002/0198437 A1 | * | 12/2002 | Juneau et al. | 600/25 |

FOREIGN PATENT DOCUMENTS

| | | |
|---|---|---|
| DE | 20 2004 001165 U1 | 6/2004 |
| EP | 1 853 088 A | 11/2007 |
| JP | 61 296900 A | 12/1986 |
| WO | 00/25551 A | 5/2000 |

OTHER PUBLICATIONS

European Search Report and Written Search Opinion of the European Searching Authority.

* cited by examiner

*Primary Examiner*—Edmund H. Lee (57) ABSTRACT

The manufacture of a hearing instrument having a hard inner shell and a softer outer covering, for insertion into the ear canal of the user, may be accomplished using rapid manufacturing and prototyping techniques. Starting with a digital model of the ear canal, a mold for the softer outer covering may be fabricated using a process such as stereo lithography.

1 Claim, 11 Drawing Sheets

FABRICATION OF A SOFT-SILICONE COVER FOR A HEARING INSTRUMENT SHELL

BACKGROUND AND SUMMARY OF THE INVENTION

A hearing instrument for insertion into the user's ear canal may be manufactured by fabricating a hard inner shell that contains the components of the hearing instrument, such as the receiver, battery, and electronics, and then an softer outer covering that conforms to the contour of the ear canal. The method described below utilizes rapid manufacturing and prototyping techniques for both the hard inner shell and the softer outer covering.

DESCRIPTION OF THE INVENTION

Figure 1:
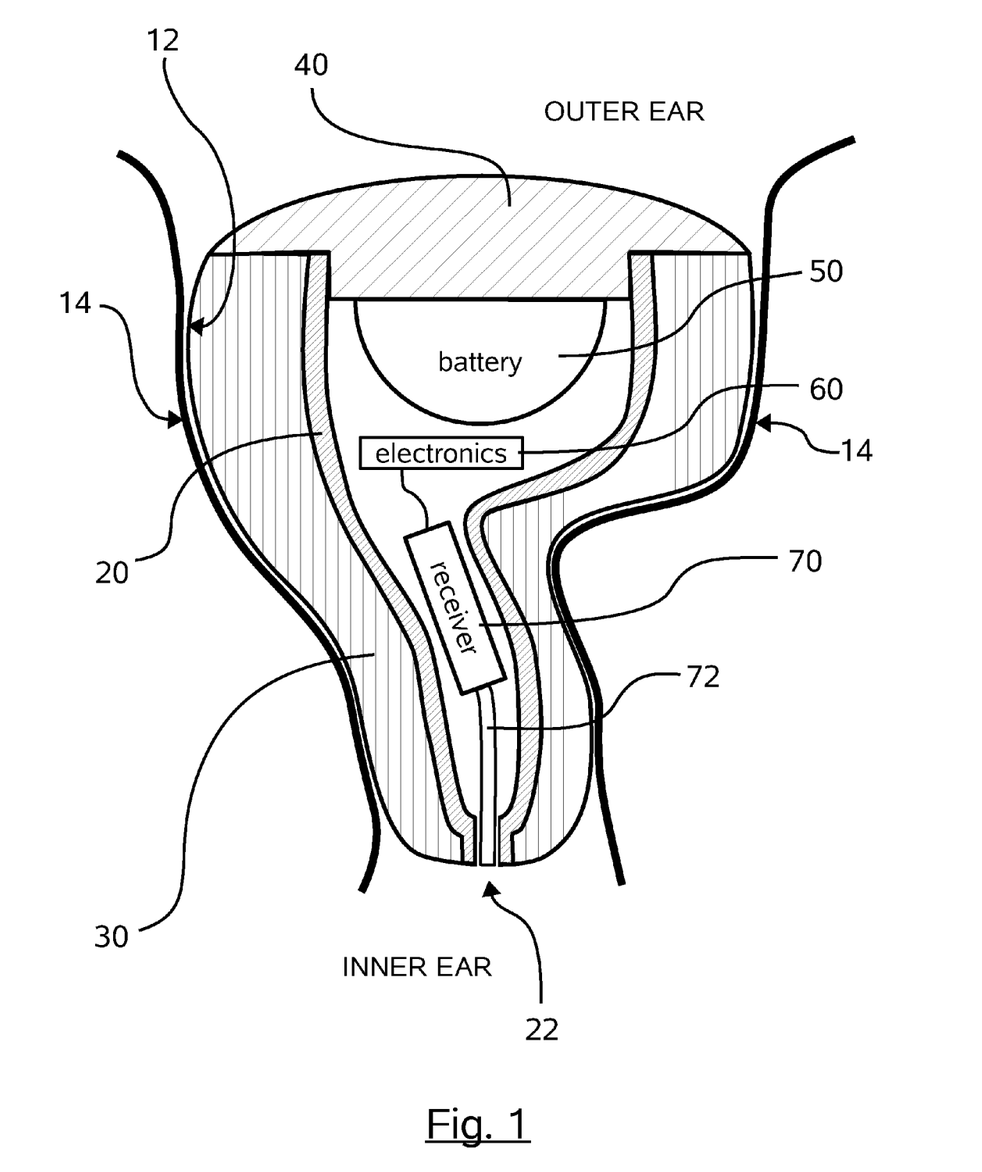
FIG. 1 is a cross-sectional view of a hearing instrument comprising a hard inner shell and a softer outer covering.
Figure 9:
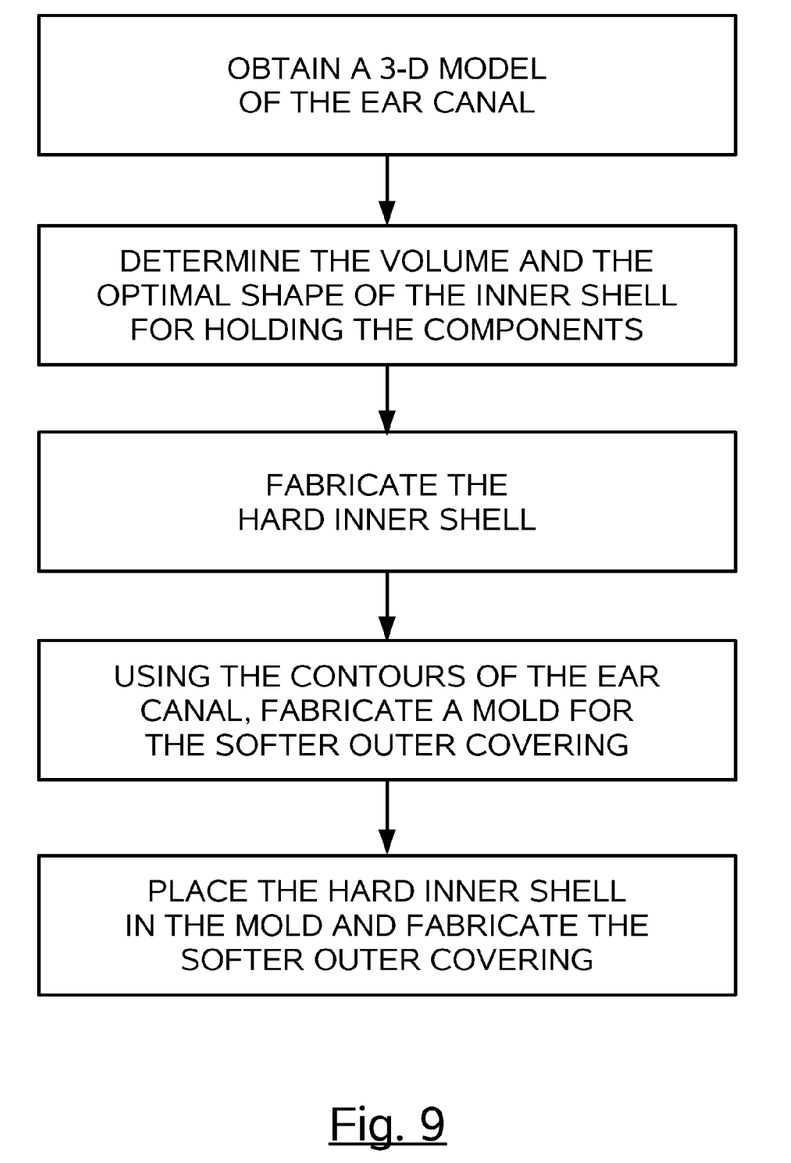
FIG. 9 is a flow chart of a fabrication process.

A hearing instrument 10 comprising a hard inner shell 20, a softer outer covering 30, and a faceplate 40 are illustrated in the cross-sectional view of FIG. 1. The instrument 10 has an outer contour 12 that may be selected to conform to the contours of the user's ear canal 14. A battery 50, an electronics module 60, a receiver 70, and a receiver tube 72 connecting the receiver to a receiver hole 22 in the hard inner shell 20 are also shown in the figure. The faceplate 40 may be added after fabrication of the inner shell 20 and the outer covering 30, and the components can be inserted during assembly of the hearing instrument 10. The process described here, and outlined in the flow chart in FIG. 9, concerns the fabrication of the hard inner shell 20 and the softer outer covering 30.

The hearing instrument 10 may be fabricated using one of the processes mentioned in U.S. Patent Application Publication No. 2002/0196954 A1, published Dec. 26, 2002 and titled, "Modeling and fabrication of three-dimensional irregular surfaces for hearing instruments," incorporated here by reference. As a preliminary step, a three-dimensional model of the contours of the user's ear canal 14 is obtained. This is used to define the outer contour 12 of hearing instrument's softer outer covering 30.

Fabricating the Hard Inner Shell

Figure 2:
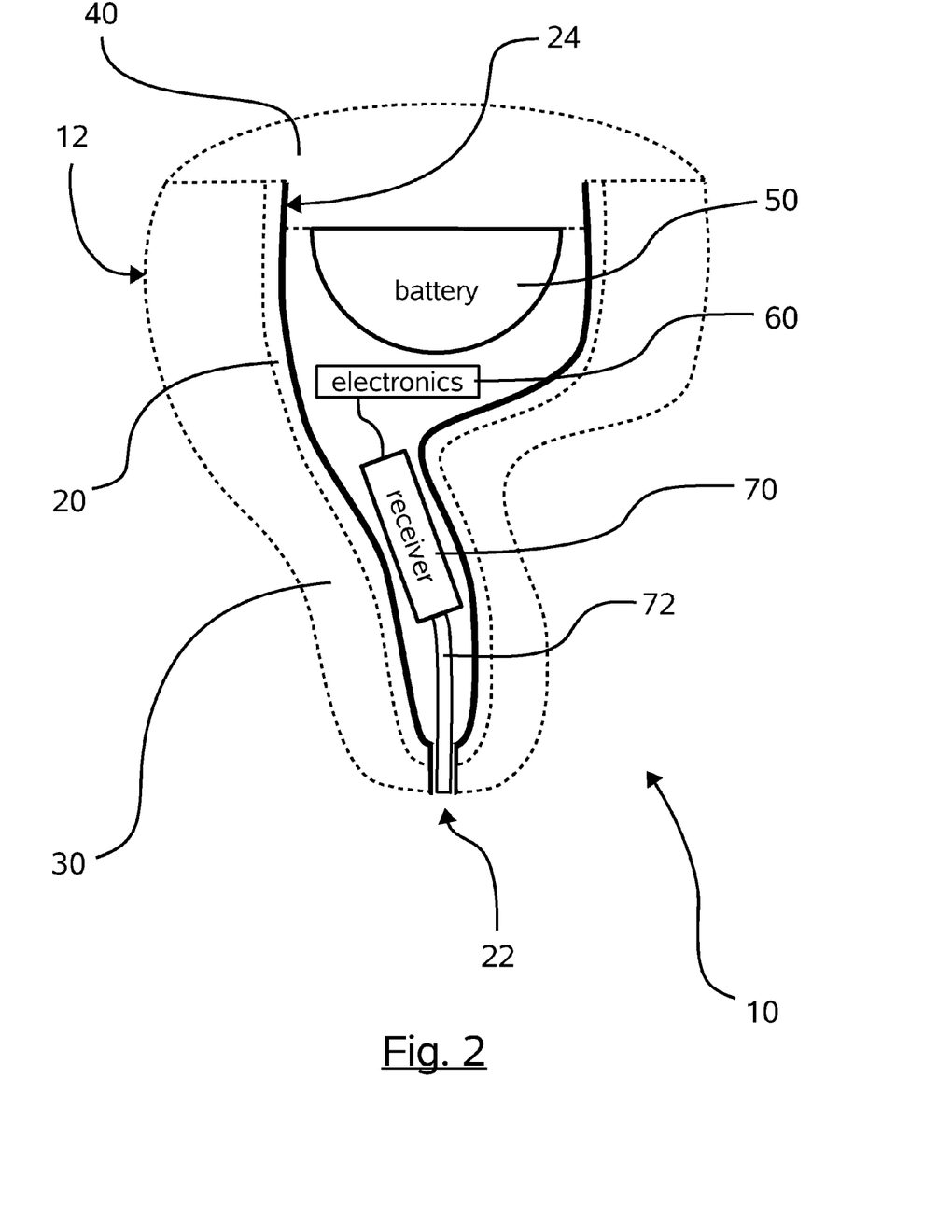
FIG. 2 is a cross-sectional view of the inner contour of the hard inner shell, sized to hold the components of the hearing instrument of FIG. 1.

The hard inner shell 20 contains the components of the hearing instrument 10. The minimum inner dimensions of the hard inner shell 20 may be determined using a method such as the component location and positioning scheme described in U.S. Patent Application Publication No. 2002/0196954 A1. This will yield the inner contour 24 shown in FIG. 2 (note the thick line to the left and right of the components; the softer outer covering 30 and the faceplate 40 are shown in phantom).

Figure 3:
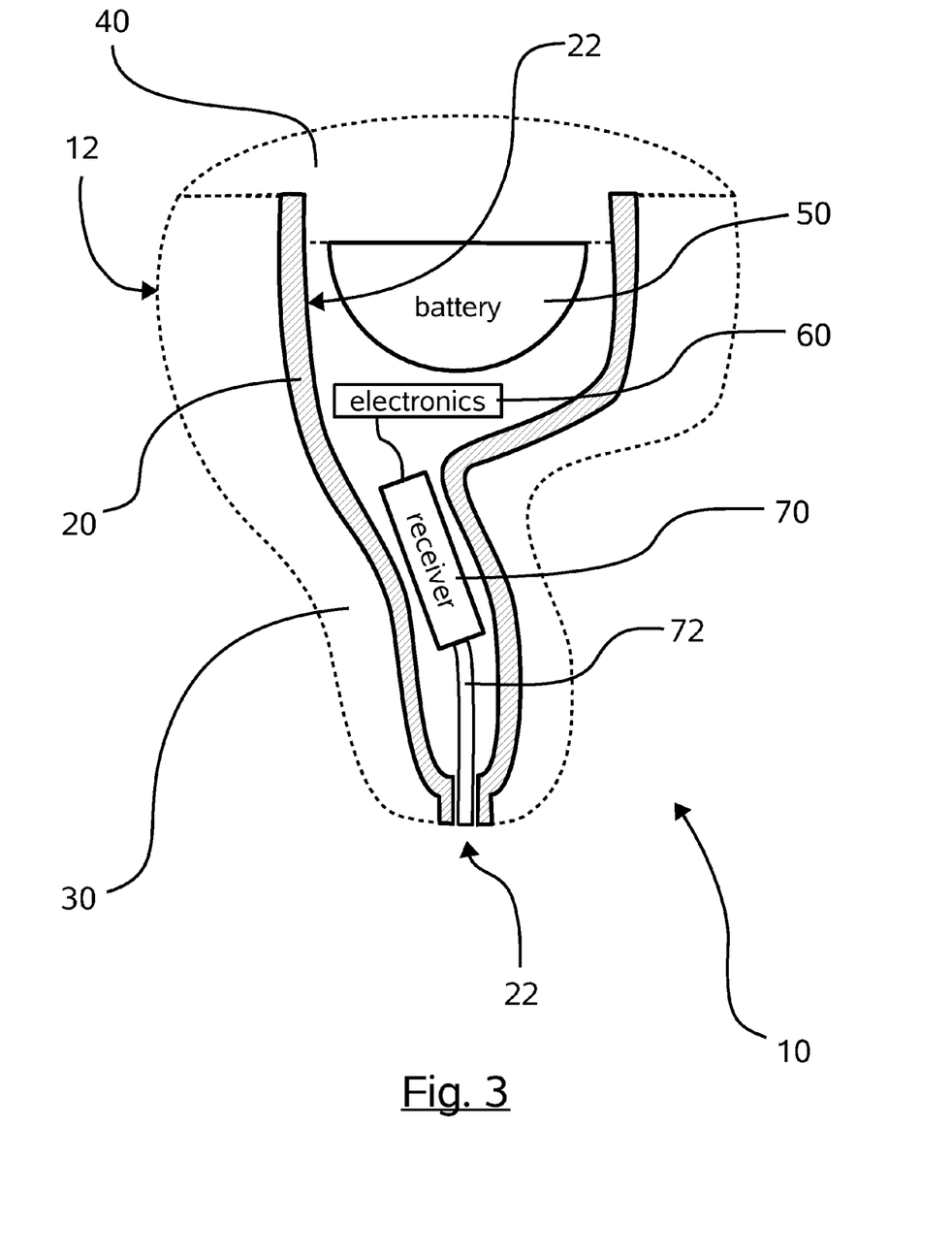
FIG. 3 is a cross-sectional view of the hard inner shell, utilizing the inner contour of FIG. 2, and the components of the hearing instrument.

The outer dimensions of the hard inner shell 20 are then determined by selecting a desired thickness (e.g., 1.5 mm). The shell 20 may then be fabricated using a process such as stereo lithography or any other desired process, yielding the shell 20 as shown in FIG. 3. The adherence of the softer outer covering 30 to the hard inner shell 20 may be enhanced by fabricating the shell 20 with a material having a high porosity.

Fabricating the Softer Outer Covering

Having fabricated the hard inner shell 20, the next step is to apply the softer outer covering 30 to the shell 20. The outer covering 30 may be fabricated using a material such as silicone.

Figure 4:
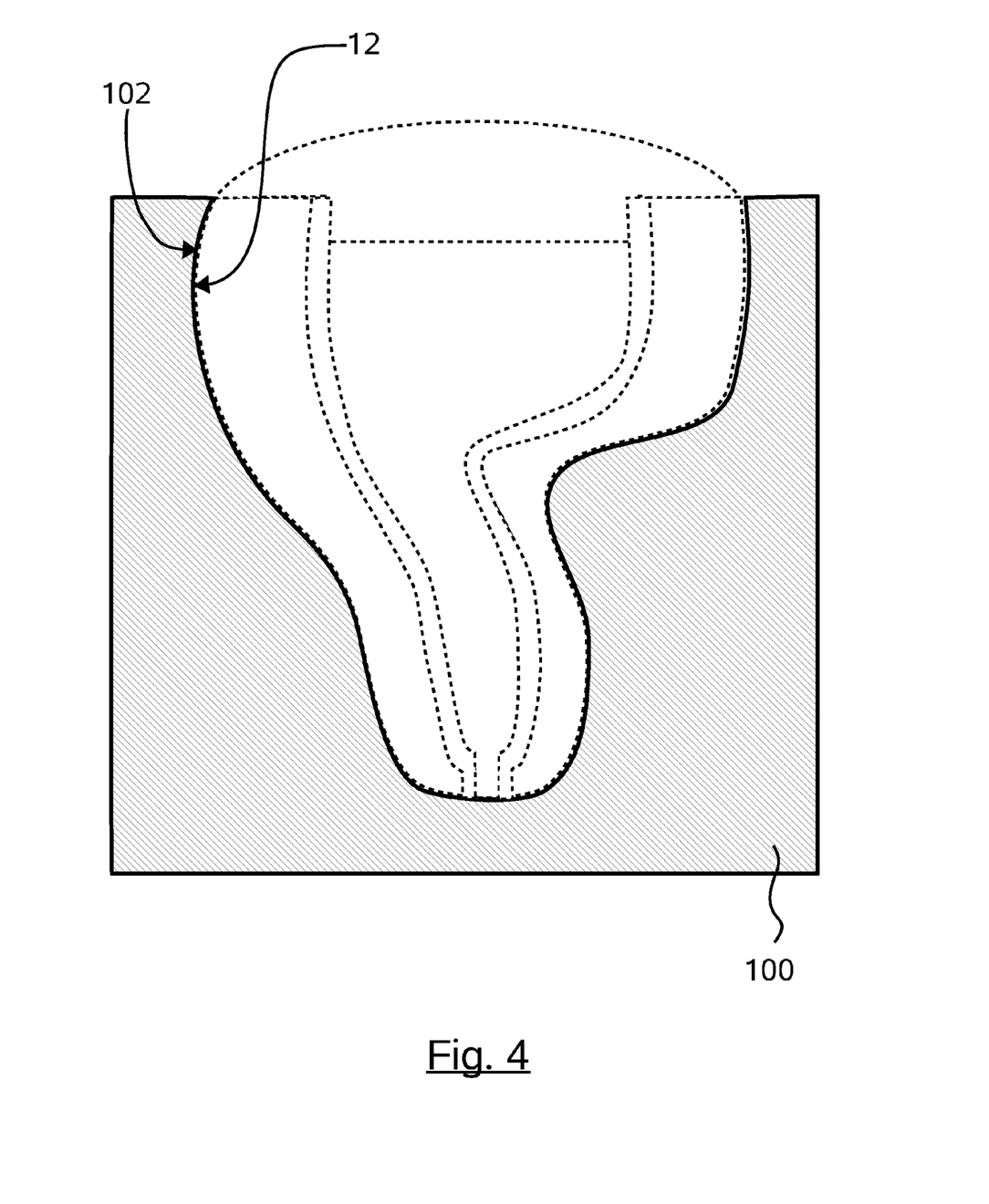
FIGS. 4 and 5 are cross-sectional drawings of a mold for fabricating the softer outer covering for the hearing instrument of FIG. 1.
Figure 5:
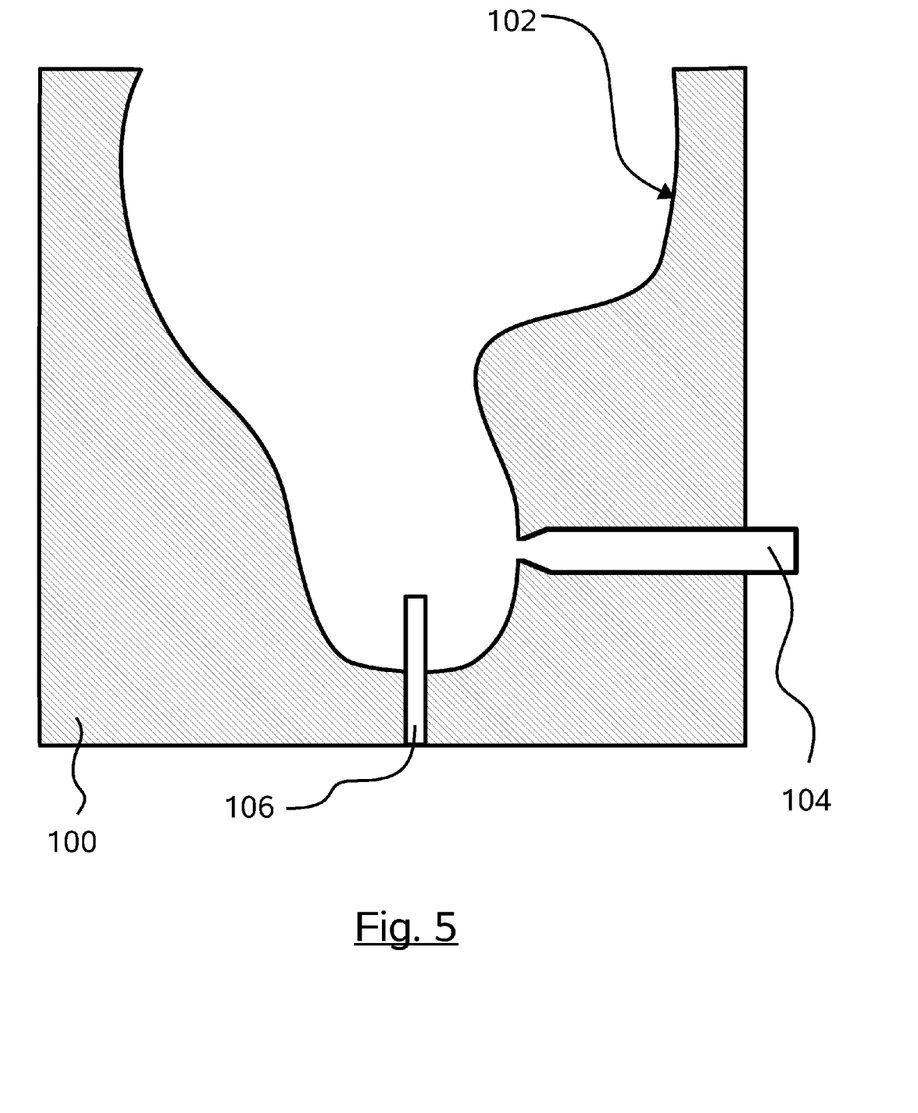

First, a mold 100 is created. A suitable mold 100 is shown in FIG. 4. The mold 100 has an inner contour 102 conforming to the outer contour 12 of the hearing instrument 10 (see FIG. 1). As depicted in FIG. 5, the mold 100 has a channel 104 for injecting the material that forms the softer outer covering 30. In addition, a pin 106 is positioned at the bottom of the mold 100 to locate and support the shell 20.

To facilitate removal of the outer covering 30 after fabrication, the mold 100 may be made from a material of low porosity. Additionally, the mold 100 may be fabricated as two halves or some other suitable configuration that aids in removing the now-combined softer outer covering 30 and hard inner shell 20 after fabrication.

Figure 6:
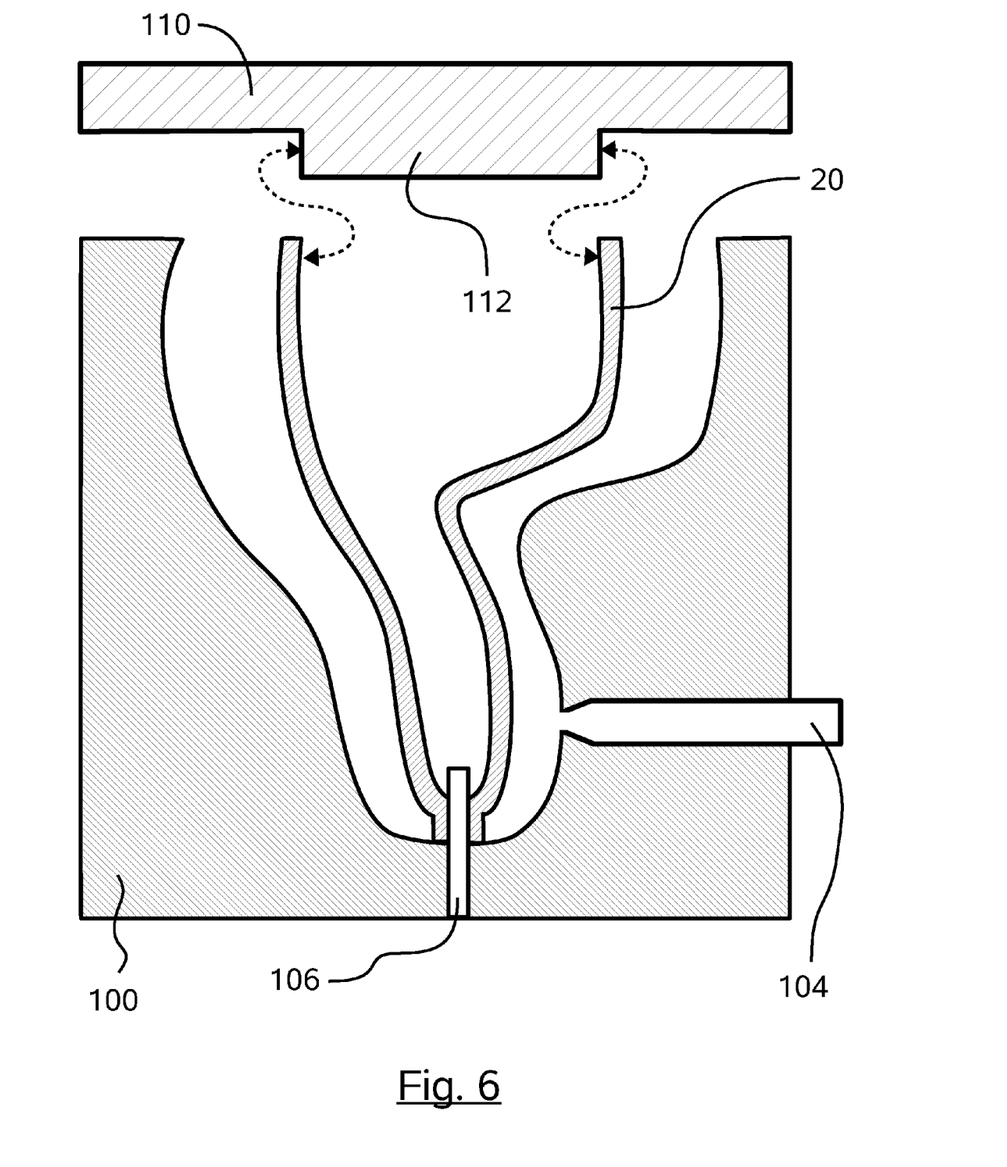
FIGS. 6, 7, and 8 are cross-sectional drawings of the mold of FIGS. 4 and 5, illustrating the placement of the hard inner shell within the mold and the fabrication of the softer outer covering for the hearing instrument of FIG. 1.
Figure 7:
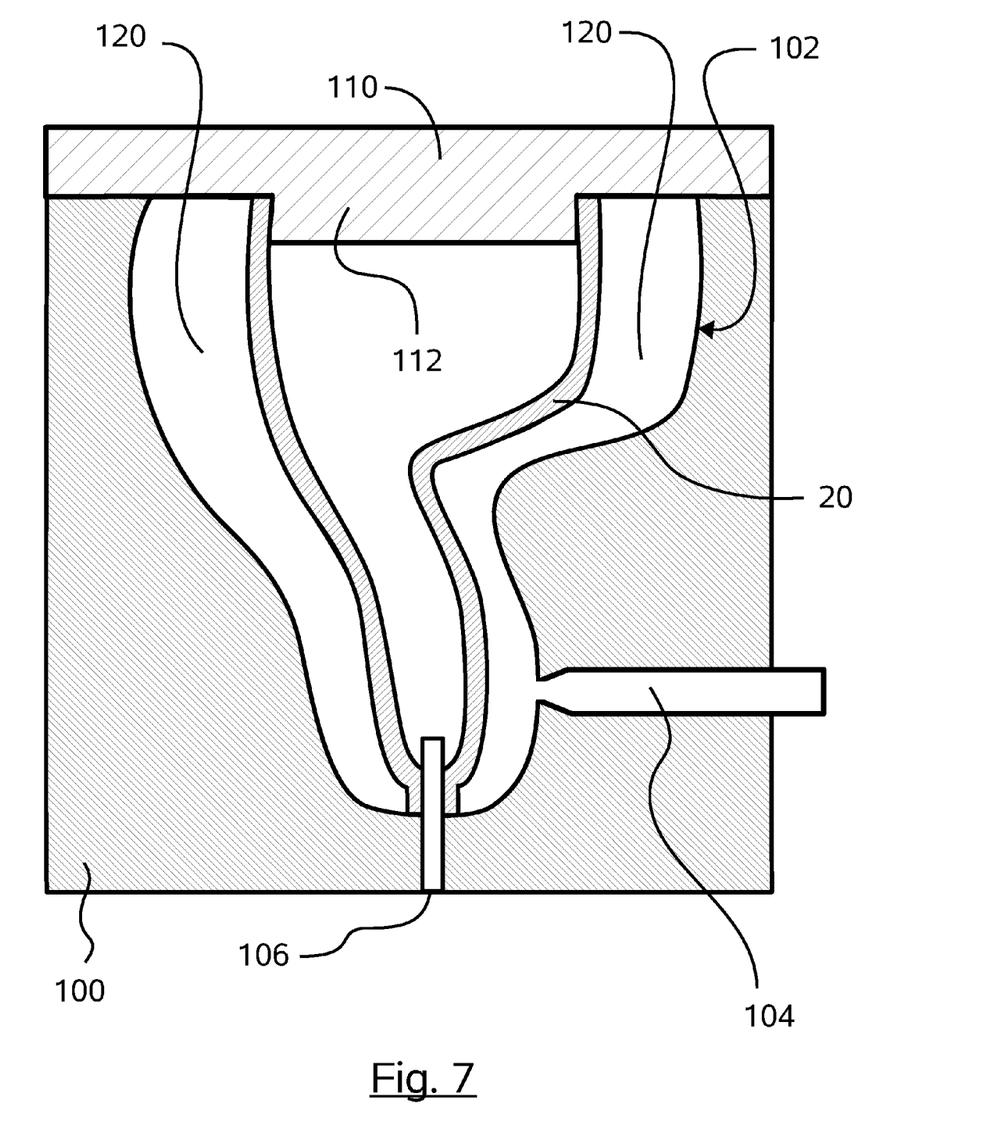

Next, as shown in FIG. 6, the hard inner shell 20 is placed in the mold 100 and onto the pin 106. A top plate 110 covers and seals the mold 100, and has a plug 112 having an outer contour conforming to the inner contour of the hard inner shell 30 where they meet (see the arrows in the figure). Referring to FIG. 7, the top plate 106 is then placed on top of the mold 100, sealing the area 120 between the hard inner shell 30 and the inner contour 102 of the mold 100.

A material, such as silicone, is now introduced through the channel 104, injecting it into the mold 100 and filling the area 120 to create the softer outer covering 30. Once the material has cured, the top plate 110 may be removed and the combined hard inner shell 30 and the softer outer covering 30 are removed from the mold 100.

Figure 8:
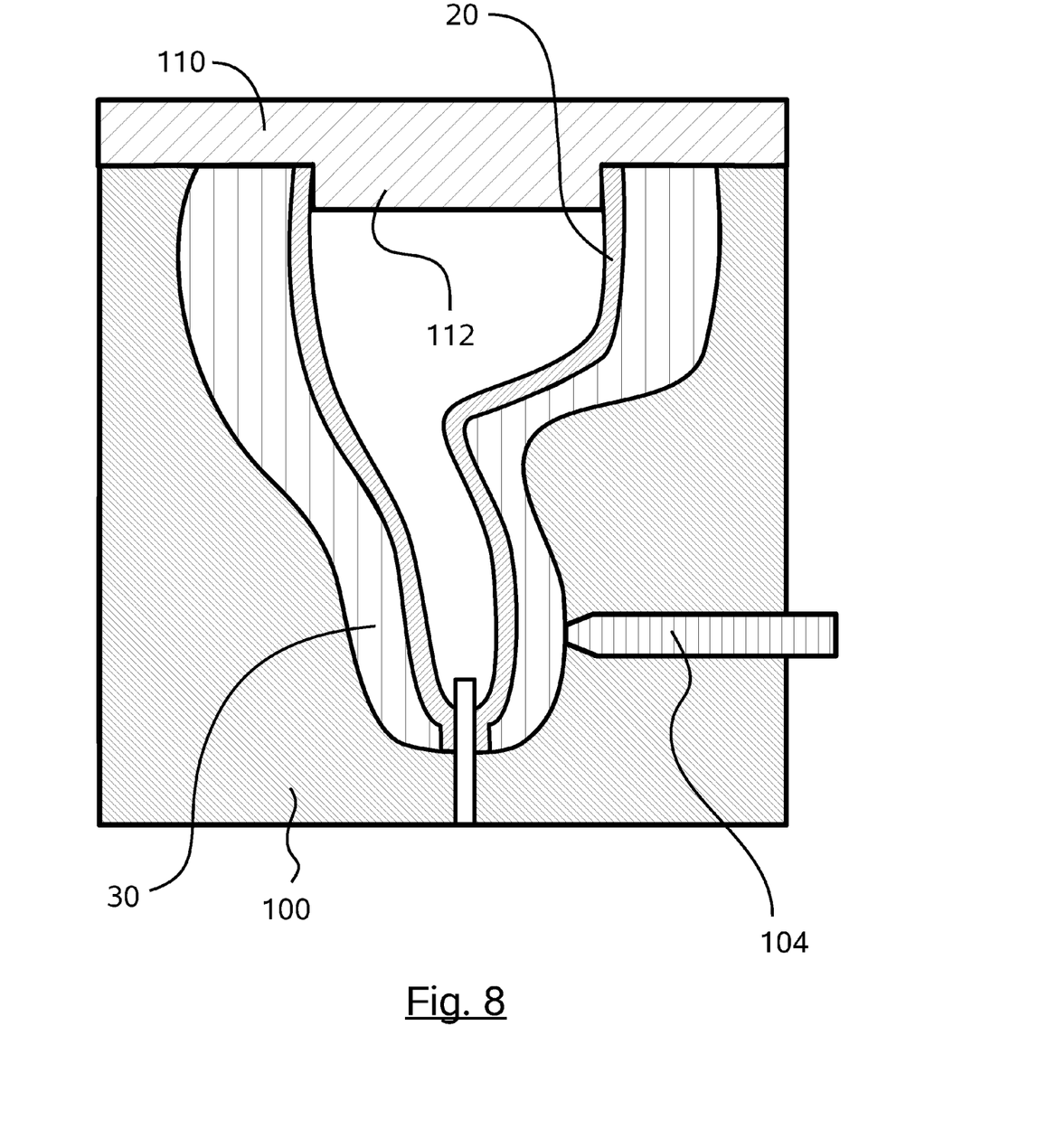
Figure 10:
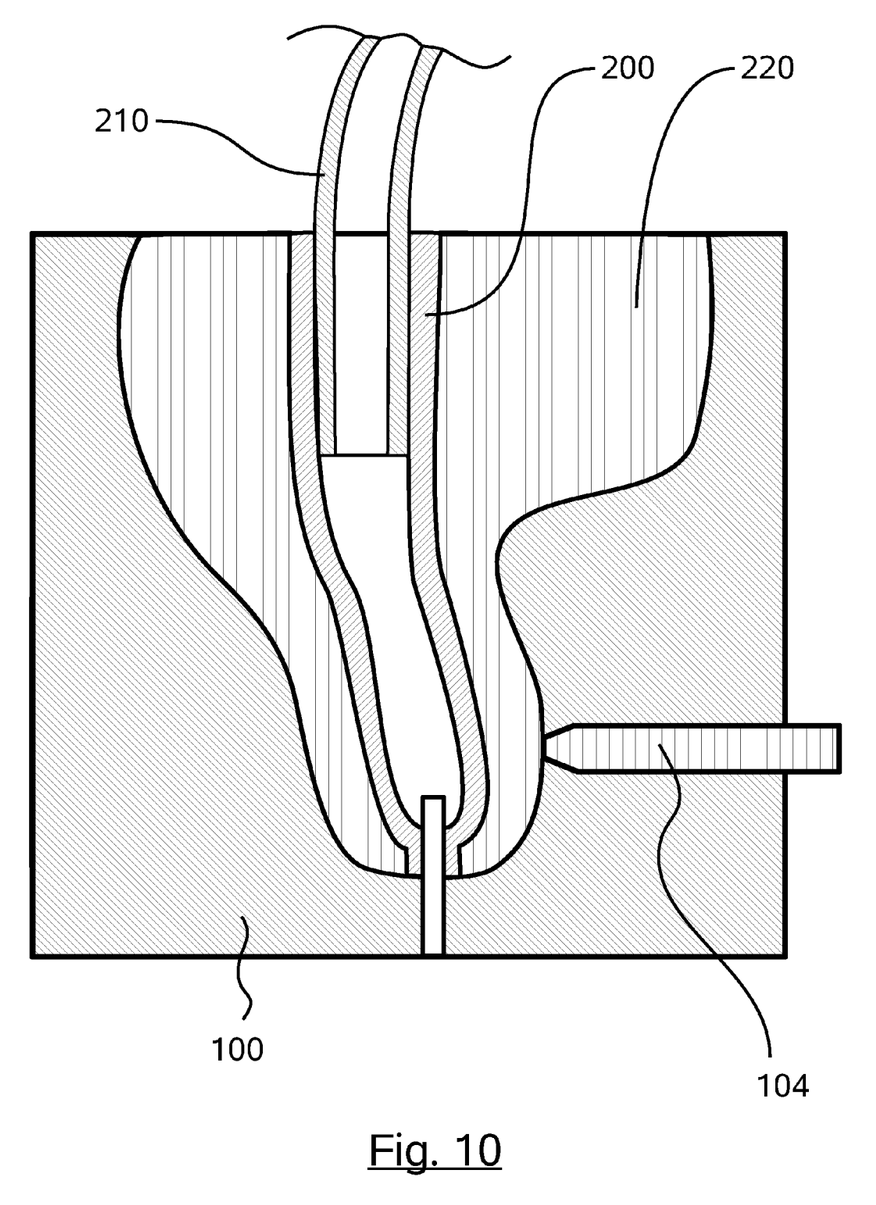
FIGS. 10 and 11 are cross-sectional drawings of a mold for fabricating the softer outer covering for an otoplastic or ear adaptor member for a behind-the-ear hearing instrument.
Figure 11:
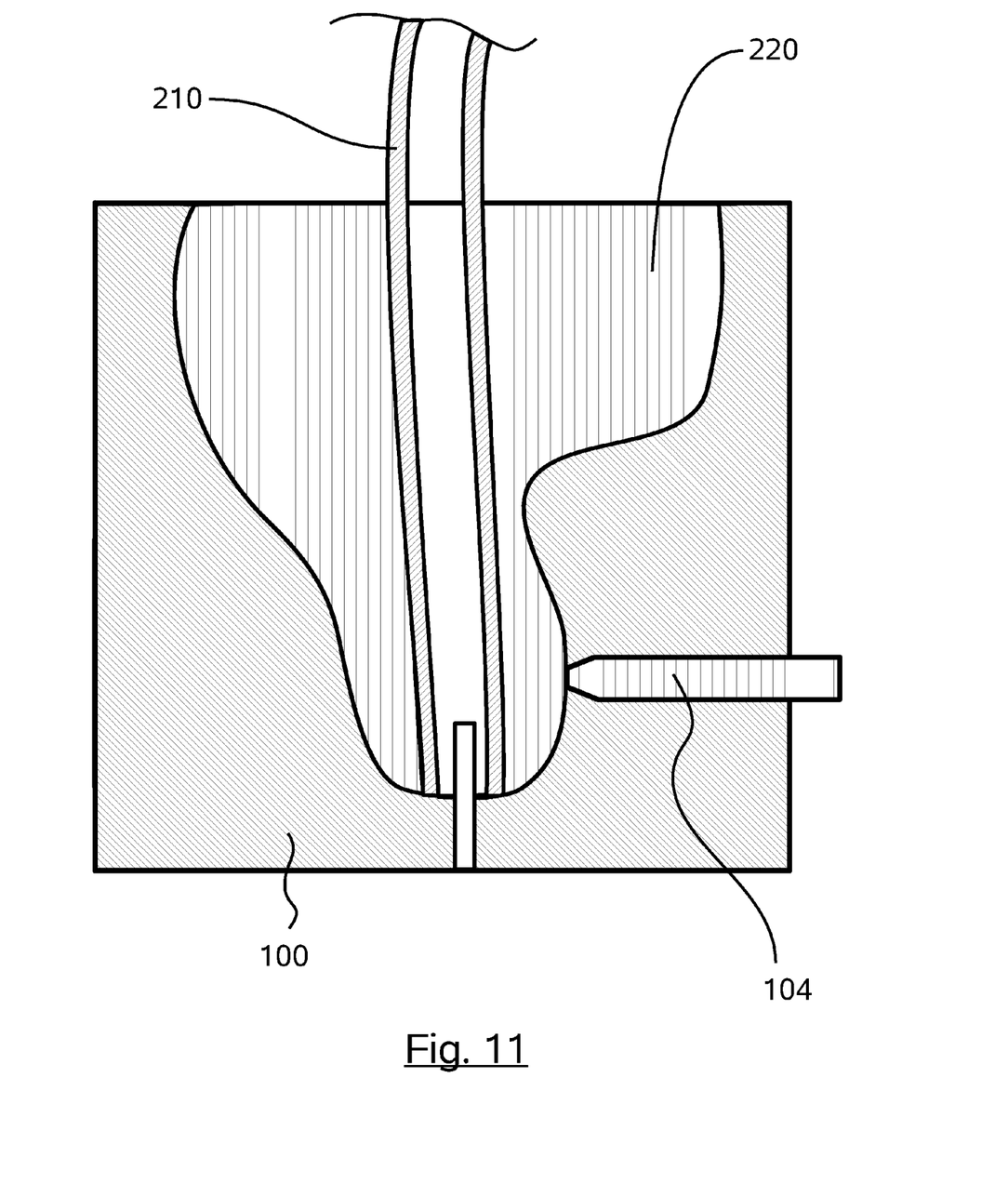

The technique described above may also be used to fabricate an otoplastic or ear adapter member for a behind-the-ear hearing instrument, such as described in U.S. Pat. No. 5,008,058, issued to Henneberger et al. on Apr. 16, 1991, incorporated here by reference. Two possible configurations are shown in FIGS. 10 and 11, respectively. In the first (FIG. 10), a hard inner receptacle 200 receives a sound conducting tube 210, which will be connected to the hearing instrument that sits behind the ear. A soft outer covering 220 is fabricated around the receptacle 200 in the same manner as the soft outer covering 30 of FIG. 8. The portion of the receptacle 200 in contact with the conducting tube 210 would conform to the outside of the tube 210. As an alternative, the sound conducting tube 210 could be placed directly within the mold 100, as illustrated in FIG. 11, and the soft outer covering 220 would be formed around the tube 210.

What is claimed is:

1. A method for fabricating a hearing instrument for insertion into the ear canal of a user, the ear canal having a contour, the hearing instrument comprising a hard inner shell containing hearing instrument components, and a softer outer covering, where the hard inner shell comprises inner dimensions, an inner contour, and a thickness, the method comprising:

determining the minimum inner dimensions of the hard inner shell for containing the hearing instrument components;

selecting a thickness for the hard inner shell;

fabricating the hard inner shell, where fabricating the hard inner shell comprises fabricating an inner contour comprising the minimum inner dimensions and the selected thickness;

fabricating a mold comprising an inner contour conforming to the contour of at least a portion of the user's ear canal;

placing the hard inner shell in the mold; and injecting a material for forming the softer outer covering into the mold between the inner contour of the mold and the hard inner shell.

* * * * *